(12) United States Patent
Krivokapic

(10) Patent No.: US 7,457,607 B2
(45) Date of Patent: Nov. 25, 2008

(54) CIRCUIT AND METHOD FOR REDUCING MOBILE STATION RECEIVER POWER CONSUMPTION BY DYNAMICALLY CONTROLLING LINEARITY AND PHASE NOISE PARAMETERS

(75) Inventor: Ivan Krivokapic, San Diego, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 516 days.

(21) Appl. No.: 11/028,831

(22) Filed: Jan. 4, 2005

(65) Prior Publication Data

US 2006/0148437 A1    Jul. 6, 2006

(51) Int. Cl.
*H04B 1/16* (2006.01)
(52) U.S. Cl. .................................. 455/343.2; 455/251.1
(58) Field of Classification Search .............. 455/200.1, 455/230, 251.1, 343.1, 343.2, 232.1, 233.1, 455/234.1, 234.2, 235.1
See application file for complete search history.

(56) References Cited

U.S. PATENT DOCUMENTS

| | | | | |
|---|---|---|---|---|
| 5,001,776 A | * | 3/1991 | Clark | 455/226.2 |
| 5,339,454 A | * | 8/1994 | Kuo et al. | 455/247.1 |
| 5,722,062 A | * | 2/1998 | Nakanishi et al. | 455/247.1 |
| 6,498,927 B2 | * | 12/2002 | Kang et al. | 455/245.2 |
| 6,564,043 B2 | * | 5/2003 | Rauhala | 455/251.1 |
| 6,670,901 B2 | * | 12/2003 | Brueske et al. | 341/139 |
| 2003/0139161 A1 | * | 7/2003 | Wieck | 455/234.1 |
| 2005/0026564 A1 | * | 2/2005 | Haub et al. | 455/67.11 |

* cited by examiner

*Primary Examiner*—Blane J Jackson
(74) *Attorney, Agent, or Firm*—Lisa K. Jorgenson; Andre M. Szuwalski

(57) ABSTRACT

A comparison is made in a number of scenarios of a current channel gain setting for a receiver to a threshold. If the current channel gain setting is less than the threshold, then current within at least a portion of the receiver is decreased. In one scenario, the comparison is only made in event that no single tone interferer is detected. In another scenario, the comparison is made to a tolerable single tone blocker threshold, and if greater then current is decreased. In another scenario, the comparison is made to an acceptable intermodulation response rejection threshold, and if greater then current is decreased. In yet another scenario, the comparison is made to an acceptable spurious free dynamic range threshold, and if greater then current is decreased. The portions of the receiver for which current decreases are implemented include a low noise amplifier, mixer, voltage controlled oscillator and variable gain amplifiers.

40 Claims, 6 Drawing Sheets

CIRCUIT AND METHOD FOR REDUCING MOBILE STATION RECEIVER POWER CONSUMPTION BY DYNAMICALLY CONTROLLING LINEARITY AND PHASE NOISE PARAMETERS

BACKGROUND OF THE INVENTION

1. Technical Field of the Invention

The present invention relates to wireless communication mobile stations and, in particular, to reducing mobile station power consumption.

2. Description of Related Art

Wireless systems in accordance with the code division multiple access (CDMA) standard are being deployed worldwide.

The harsh wireless environment in which such CDMA-based mobile stations or phones operate imposes strict requirements relating to amplifier linearity in the receiver as well as to the single sideband phase noise of the frequency synthesizer. High linearity and low phase noise are desired, but designing the receiver to achieve these goals often comes at the price of increased power consumption by the mobile station. At the same time, however, there is a consumer demand for longer talk time with their mobile station, and thus a conflicting design need arises to restrict or reduce mobile station power consumption. Balancing between these conflicting needs presents a significant design consideration.

The receiver of the mobile station tends to be one of the higher power consuming blocks within the mobile station. A need exists in the art to minimize receiver power consumption. There would be an advantage if such minimization could be achieved through a dynamic optimization of amplifier linearity and frequency synthesizer single sideband phase noise across a wide range of input signal levels and gain settings.

SUMMARY OF THE INVENTION

In accordance with one embodiment of the invention, a determination is made as to whether a single tone interferer is present with respect to a receiver received signal. If not, then a comparison is made of a current channel gain setting for the receiver to a first threshold. If the current channel gain setting is less than the first threshold, then current within at least a portion of the receiver is decreased.

In accordance with another embodiment of the invention, channel power with respect to a receiver received signal is measured. Receive signal path gain within the receiver is then adjusted. A comparison is then made of a current channel gain setting for the receiver to a threshold. If the current channel gain setting is less than the threshold, then current within at least a portion of the receiver is decreased. Otherwise, if the current channel gain setting is higher than the threshold, then current within at least a portion of the receiver is increased.

BRIEF DESCRIPTION OF THE DRAWINGS

A more complete understanding of the invention may be obtained by reference to the accompanying drawings wherein.

DETAILED DESCRIPTION OF THE DRAWINGS

Figure 1:
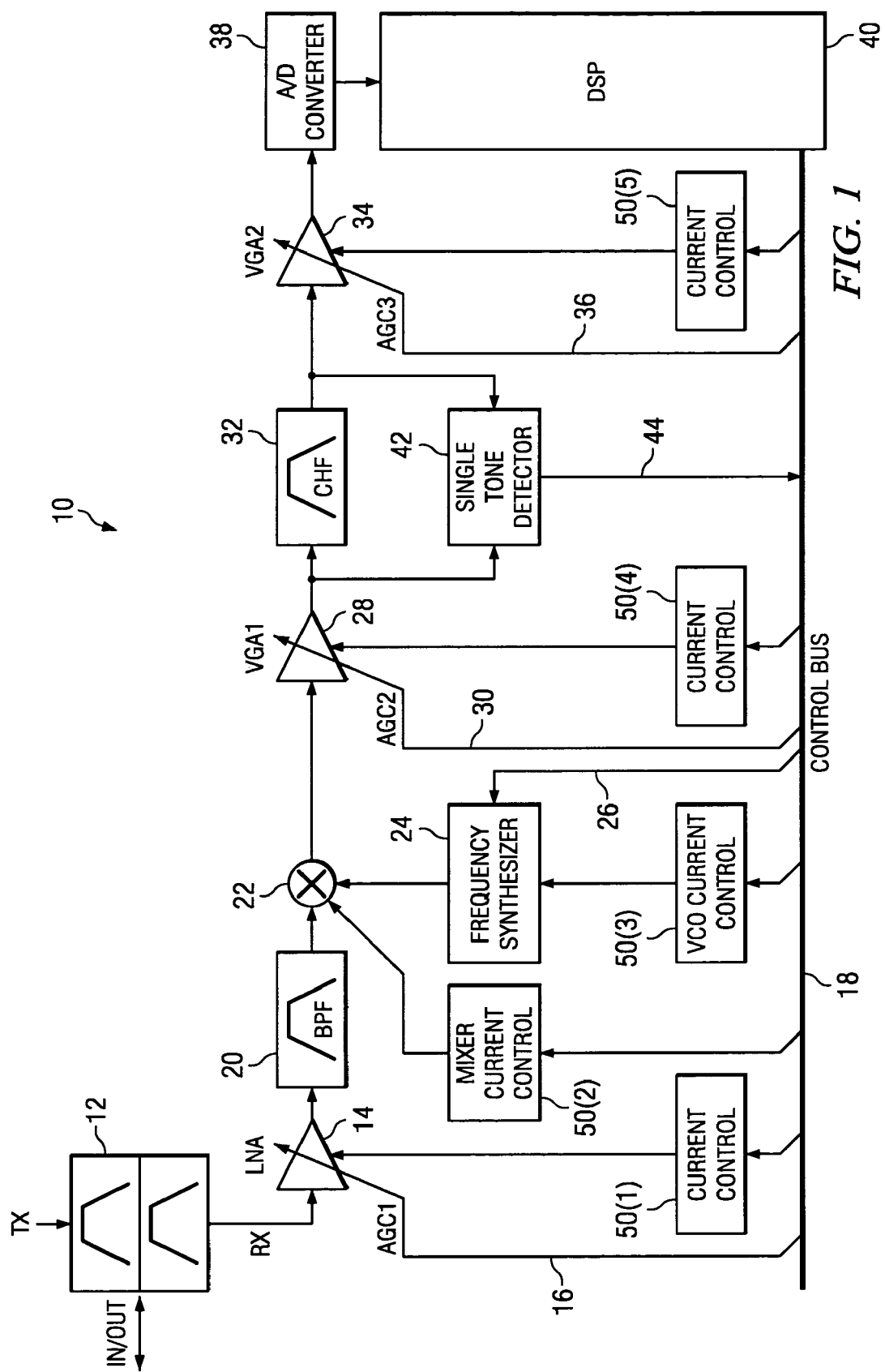
FIG. 1 is a block diagram of a mobile station receiver.

Reference is now made to FIG. 1 wherein there is shown a block diagram of a mobile station receiver 10. The block diagram is representative of a typical mobile station homodyne or heterodyne receiver architecture. The receiver 10 could be implemented as a direct conversion (with I/Q path) receiver, a near zero intermediate frequency (IF) receiver or a standard superheterodyne receiver. The receiver 10 is preferably implemented using integrated circuit technologies, on one or more integrated circuit chips. In one implementation, the resulting integrated circuit chip could include the receiver 10 and any necessary associated circuitry. In another implementation, the integrated circuit may include only the analog portions of the receiver, with digital processing portions being provided on a separate integrated circuit chip. In yet another implementation, the receiver 10, along with its associated transmitter (not shown) may be implemented on a common integrated circuit chip, with or without digital processing portions.

The receiver 10 includes a duplexer 12 with an input/output port that can be connected to an antenna (not shown) as well as an input port for receiving a transmit signal (TX) and an output port for outputting a received signal (RX). The duplexer 12 operates in a well known manner to substantially block the transmit signal as received at the input port from leaking and being output from the output port.

The received signal output from the output port is processed by a variable gain low noise amplifier (LNA) 14. The gain of the LNA 14 is set responsive to a control signal (AGC1) 16 that is generated in response to a gain setting command present on a control bus 18.

The signal output from the LNA 14 is then processed by a bandpass filter (BPF) 20.

The filtered output signal is then applied to a mixer 22. Again, the mixer 22 may be utilized in any of a direct conversion receiver architecture, a near zero intermediate frequency receiver architecture or a standard superheterodyne receiver architecture, as is well known to those skilled in the art. The mixer 22 receives its mixing frequency signal from a frequency synthesizer 24 which may comprise a voltage controller oscillator (VCO). The frequency of the mixing signal is set responsive to a control signal 26 that is generated in response to a frequency setting command present on a control bus 18.

The downconverted (either to IF or baseband) signal output from the mixer 22 is then processed in a first variable gain amplifier (VGA1) 28. The gain of the VGA1 28 is set responsive to a control signal (AGC2) 30 that is generated in response to a gain setting command present on a control bus 18.

The VGA1 28 output first amplified signal is then passed through a channel filter (CHF) 32.

The CHF 32 output filtered signal is then processed in a second variable gain amplifier (VGA2) 34. The gain of the VGA2 34 is set responsive to a control signal (AGC3) 36 that is generated in response to a gain setting command present on a control bus 18.

The VGA2 34 output second amplified signal is then processed by an analog-to-digital (A/D) converter 38 whose digital signal output is received by a digital signal processor (DSP) 40.

The digital signal processor 40 is connected to the control bus 18 and further operates to generate commands output to the bus 18 which effectuate gain control over the amplifiers 14, 28 and 34, and effectuate frequency selection for the mixing frequency signal generated by the frequency synthesizer 24.

The receiver 10 further includes a single tone detector (STD) 42 having a pair of inputs connected on either side of the channel filter 32. The single tone detector 42 measures the signal on either side of the channel filter 32 and those measurements are output from the single tone detector 42 in a signal (STD) 44 to the control bus 18 for communication to the digital signal processor 40. Within the digital signal processor 40, the STD signals relating to the measurements may be processed in any of a number of ways. In particular, FIG. 6A to be described herein shows one processing algorithm.

The receiver 10 further includes a plurality of current control circuits 50 each having an input connected to the control bus 18. The input receives a current setting command which is generated by the digital signal processor 40 and is present on the control bus 18. A first current control circuit 50(1) has an output coupled to the LNA 14 through which current consumption by the LNA is adjusted. A second current control circuit 50(2) has an output coupled to the mixer 22 through which current consumption by the mixer is adjusted. A third current control circuit 50(3) has an output coupled to the voltage controlled oscillator of the frequency synthesizer 24 through which current consumption by the VCO is adjusted. A fourth current control circuit 50(4) has an output coupled to the VGA1 28 through which current consumption by the VGA1 is adjusted. A fifth current control circuit 50(5) has an output coupled to the VGA2 34 through which current consumption by the VGA2 is adjusted.

The current control circuits 50 are implemented in a conventional manner recognized by those skilled in the art wherein a variable bias circuit using an adjustable current source is provided to allow for step-wise or continuous adjustments to be made in the bias current supplied to the associated receiver component. Responsive to the currrent setting command received over the control bus 18, the variable bias circuit within the current control circuits 50 adjusts the supply of provided bias current for component operation. By adjusting the supplied bias current, overall current consumption by the receiver may be controlled (and reduced). As will be discussed in detail below, by selectively making these adjustments current consumption can be reduced without adversely affecting receiver operation.

Through use of the control bus 18, the digital signal processor 40 exercises adjustment control over both current consumption and gain within the receiver 10. This adjustment control can be implemented through the execution of an appropriate algorithm, examples of which will be discussed in further detail herein.

Receiver 10 linearity may be described using a number of parameters such as single tone desensitization, intermodulation response rejection and spurious free dynamic range. Each of these parameters depend on the third order intercept point (IP3) which represents a measure of receiver intermodulation distortion (IMD). Additionally, single tone desensitization includes the effect of reciprocal mixing between single side-band (SSB) phase noise of the frequency synthesizer and single tone adjacent channel blocker.

The input IP3 of the receiver 10 depends on its gain. Varying signal levels at the receiver input cause action by the automatic gain control (AGC) loop executed by the DSP 40 to balance receiver gain adjustment versus optimal A/D converter 38 set point. The most critical case appears when the receiver 10 operates on, or close to, its maximum sensitivity that is defined in CDMA versus frame error rate. In this case, the gain of the receiver 10 is very high and the IP3 is relatively low. In a typical implementation, the IP3 and SSB phase noise of the frequency synthesizer for the receiver are determined once for the worst case at maximum receiver sensitivity. As desired signal level on the receiver input increases and receiver gain subsequently decreases (due to the operation of the AGC process), the IP3 and local oscillator SSB phase noise in many cases exceed requirements for a higher input signal level (often by a substantial margin). Since receiver 10 current consumption increases as IP3 increases, it is possible to minimize current consumption in the receiver by reducing the IP3 margin for lower receiver gains.

Figure 2A:
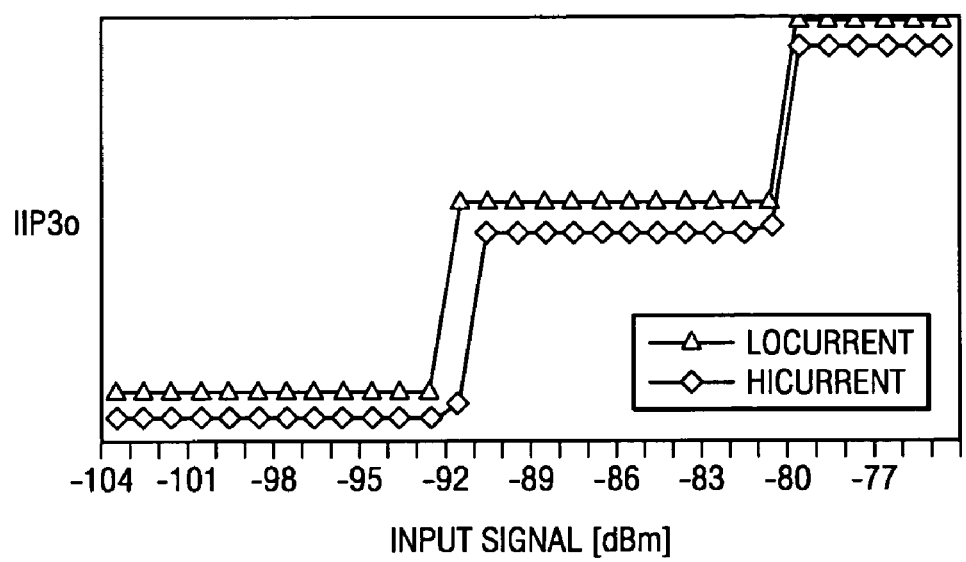
FIGS. 2A and 2B are graphs showing the dependency of out-of-channel and in-channel, respectively, cascaded receiver input third order intercept point versus amplifier/mixer current.
Figure 2B:
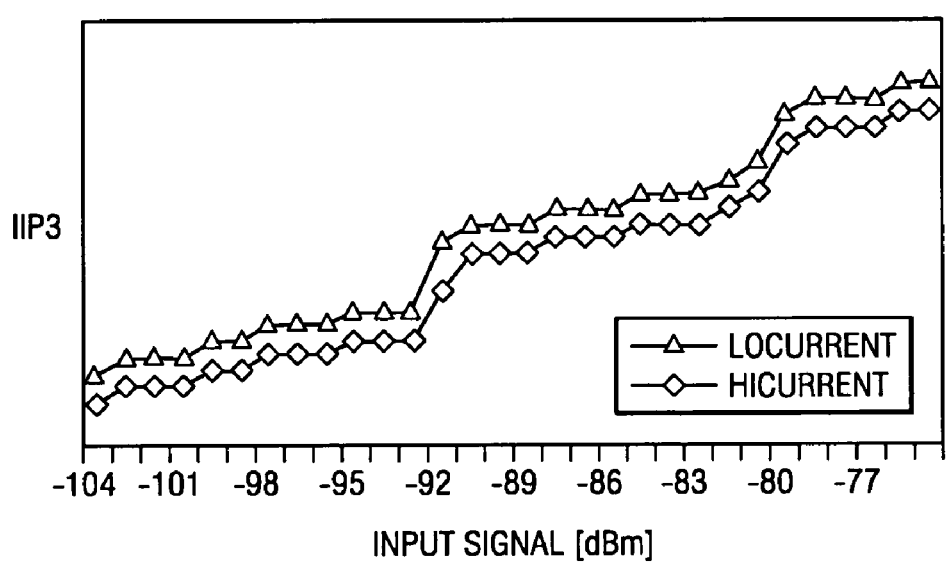

FIGS. 2A and 2B show the dependency of out-of-channel (IIP3o) and in-channel (IIP3), respectively, cascaded receiver input third order intercept point versus amplifier/mixer current (high and low) assuming that receiver gain is adjusted in such a way that IP3 and receiver noise figure (NF) for each gain point are optimized and the following equation is met:

$$Sout = Sin + Grx = \text{const} \qquad (1)$$

wherein: Sout=signal on the receiver A/D converter,
Sin=input signal at antenna port, and
Grx=receiver gain.

It will be noted that the dependency curves for the out-of-channel (IIP3o) operation have a stepped characteristic due to gain control operation of the LNA 14 being a stepped function.

Figure 3A:
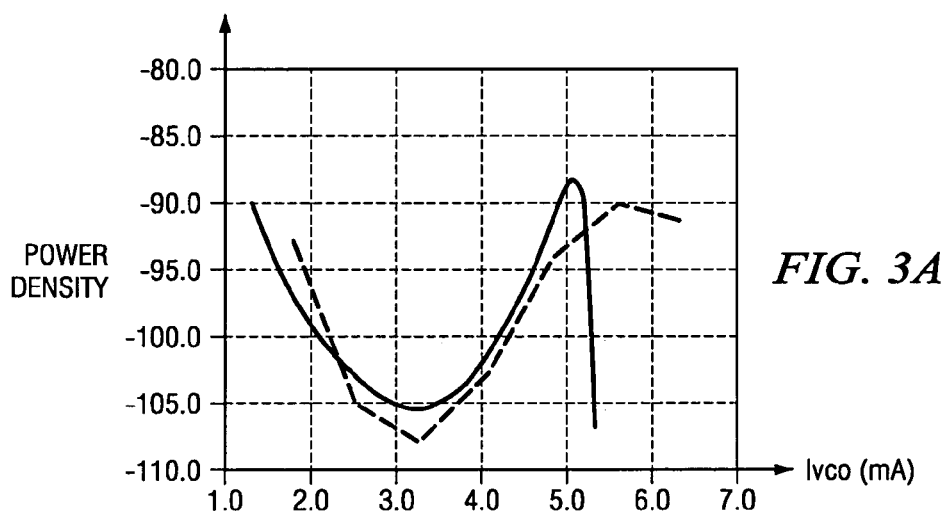
FIGS. 3A and 3B are graphs showing voltage controlled oscillator phase noise power density versus collector current (Ivco)
Figure 3B:
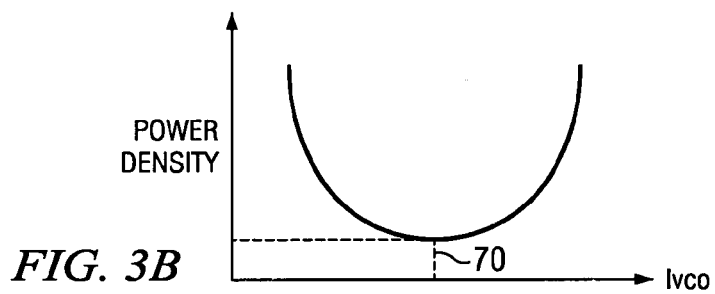

Reference is now made to FIG. 3A which shows measured and simulated (smooth curve breakdown at 6 mA) voltage controlled oscillator phase noise power density versus collector current (Ivco). See, "RF/Microwave Circuit Design for Wireless Applications," Ulrich L. Rhode, David P. Newkirk, page 802. The voltage controlled oscillator of the frequency synthesizer 24 represents a significant consumer of current. It is recognized that current consumption by the VCO could be decreased by sacrificing its SSB phase noise performance. This may be accomplished, for example, by moving its operational point to the left (i.e., reducing current) from an optimal phase noise point (minimum current) 70 on the idealized curve PN=f (Ivco) as shown in FIG. 3B.

Figure 4A:
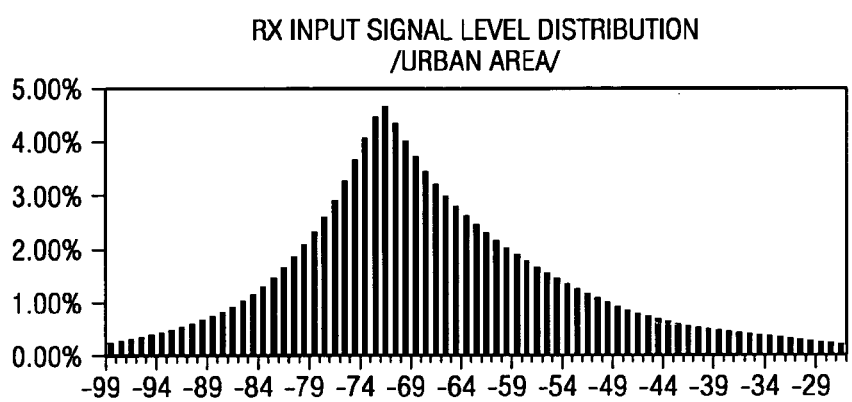
FIGS. 4A and 4B show profiles or signal level distributions for wireless communications in urban and suburban areas, respectively.
Figure 4B:
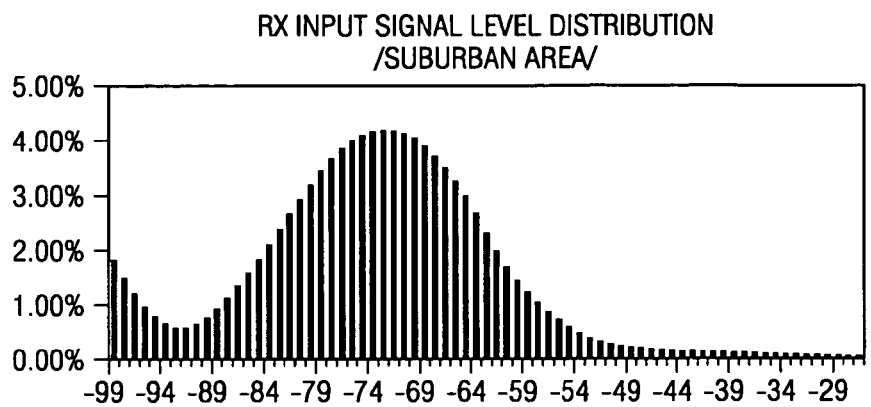

Advantages of controlling receiver current so as to effectuate receiver power saving can be better recognized by analyzing profiles or signal level distributions for wireless communications in urban and suburban areas as shown in FIGS. 4A and 4B, respectively. Looking at the diagrams, it is readily apparent that a receiver operates with very low input signal levels during only a relatively small amount of time, while a significant majority of time is spent with high and very high input levels. The foregoing would accordingly indicate that reducing IP3 and phase noise performance in the case of high input signal levels by reducing current consumption will lead to significant power savings in the mobile station receiver.

The desensitization characteristic of the mobile station receiver determines its ability to operate under the presence of a strong single-tone adjacent channel interferer. The single tone interferer affects the receiver in two ways. A first affect is related to a cross-modulation effect and second affect is related to a reciprocal mixing effect.

Overall noise contribution to the receiver input could be expressed as:

$$Neq=Ist+(No+Nt)BW \quad (2)$$

wherein:
No=the noise floor of the receiver,
Nt=the background thermal noise floor,
Ist=the noise contributed by cross-modulation (Icmd) and reciprocal mixing (Imix) effects, and
BW=the channel bandwidth.

Cross-modulation occurs due to the mixing of a single tone interferer (specified to be at an adjacent channel) and the transmitted (TX) signal that leaks through the duplexer 12 to the LNA 14 input. Since the LNA 14 is followed by the bandpass filter 20, an additional suppression of the TX input signal occurs and the cross-modulation effect thus occurs mainly in the LNA. The noise contribution due to cross-modulation could be expressed as:

$$Icmd=2Ptx+Pst-2IIP_{3LNA}-3 \quad (3)$$

wherein:
Ptx=transmitter power on the LNA input,
Pst=single tone power on the LNA input, and
$IIP_{3LNA}$ is third order input intercept point of the LNA.

A second noise contributory effect is reciprocal mixing. This effect appears as a result of frequency synthesizer SSB noise folding into the receiver channel due to its mixing with the single tone interferer. The noise contribution from reciprocal mixing could be estimated as:

$$Imix=Pst+PN+10\log(BW) \quad (4)$$

wherein:
PN=is the SSB phase noise level at channel bandwidth frequency offset away from carrier.

Equivalent noise Neq as set forth from Equation (2) has to be low enough to accommodate required carrier to noise ratio at highest specified receiver sensitivity.

The single tone desensitization point is specified only for high receiver gain. The receiver gain, however, decreases as the desired input signal level increases. It is accordingly possible to decrease the LNA 14 IIP3 by reducing its current while at the same time decreasing the current of the frequency synthesizer VCO (and thus increase its phase noise), as long as an acceptable carrier to noise ratio and error vector magnitude are maintained for the given input signal level.

Intermodulation response rejection (IRR) is a measure of the ability of a receiver to receive a signal with an acceptable degradation level while in the presence of two out-of-channel interfering continuous wave (CW) signals. These two signals are separated in such a way that their third order intermodulation product falls in channel of interest. Intermodulation response rejection is defined as:

$$IRR_3=2(IIP_{3O}-Pi)/3 \quad (5)$$

wherein:
$IRR_3$=the intermodulation rejection,
$IIP_{3O}$=the receiver out-of-channel third order intercept point, and
Pi=the power level of the desired input signal.

With respect to the receiver implementation illustrated in FIG. 1, the LNA 14, mixer 22, and VGA1 28 are primarily responsible for generating the third order distortion. This is because the VGA2 34 is not significantly affected by a two tone interferer due to the high adjacent channel rejection provided by the channel filter 32 placed between VGA1 and VGA2. Since the $IIP_{3O}$ increases as the receiver gain decreases (see, FIG. 2A), it is likely that at some receiver gain point the $IRR_3$ will exceed its requirements. It is accordingly possible to optionally decrease the current of VGA1 28 and the mixer 22 (depending, for example, on given third order intermodulation constraints and assuming that LNA current is already optimized for required single tone desensitization level).

The dynamic signal operational range is set such that the receiver is free of spurious signals resulting from third order intermodulation products. However, an increase of input power will cause third order spurious signals to increase above the noise floor. Receiver in-channel $IIP_3$ determines the magnitude of spurious free dynamic range (SFDR) which is defined as:

$$SFDR=2(IIP_3-N_{FRX})/3 \quad (6)$$

wherein:
$IIP_3$=the receiver in-channel third order intercept point, and
$N_{FRX}$=the receiver noise floor.

With respect to the receiver 10 of FIG. 1, the whole receiver amplifier chain participates in generation of the third order distortion. Since $IIP_3$ increases as receiver gain decreases (see, FIG. 2B), often at some receiver gain point the SFDR exceeds requirements and it is then possible to decrease current of VGA2 to achieve the desired $IIP_3$, assuming that the LNA, mixer and VGA1 currents are already optimized for required single tone desensitization level and $IRR_3$ respectively.

Figure 5:
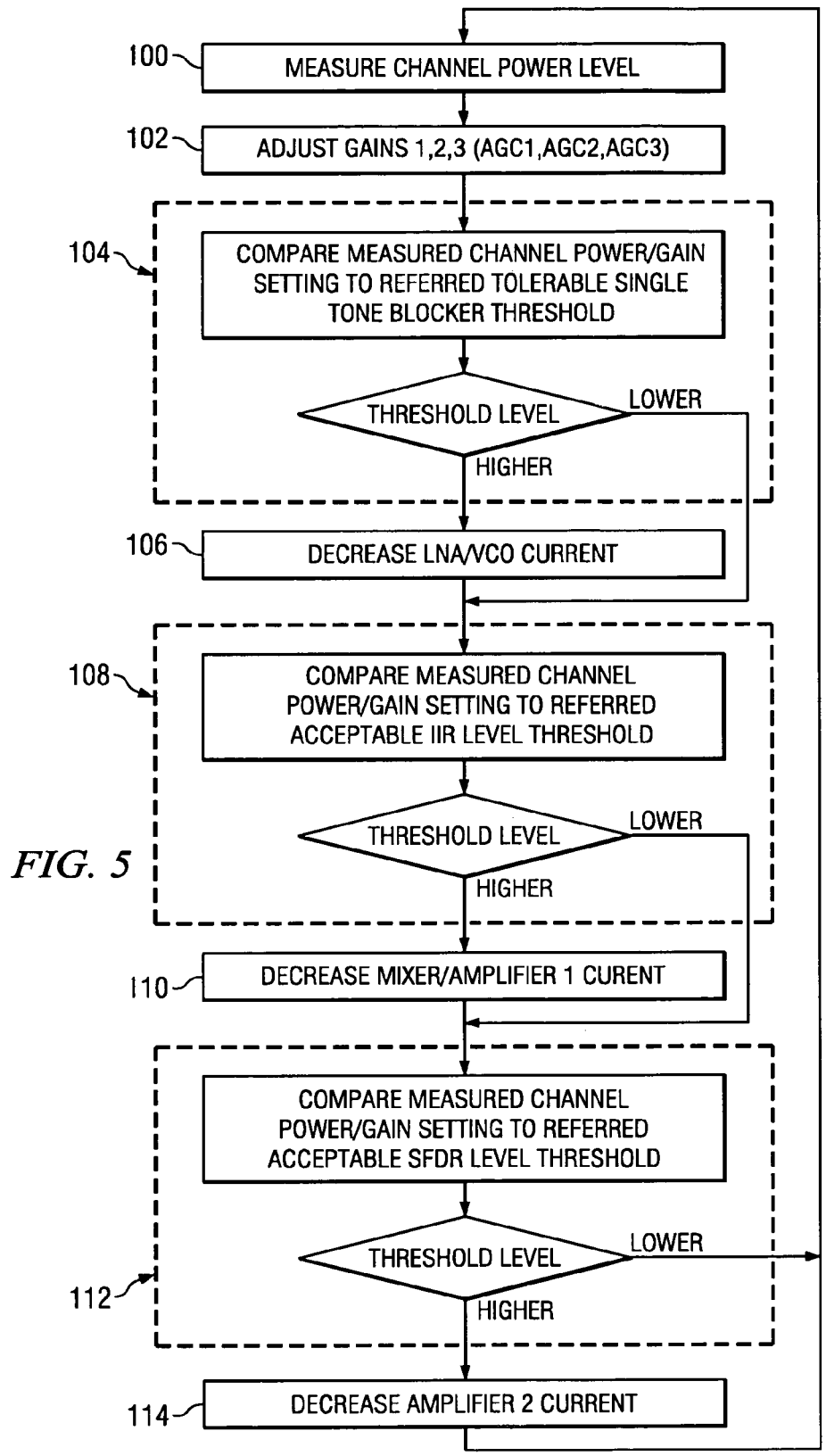
FIG. 5 is a flow diagram illustrating a first current control algorithm.

Reference is now made to FIG. 5 wherein there is shown a flow diagram illustrating a first current control algorithm for setting operation of the receiver 10 of FIG. 1 in accordance with an embodiment of the invention. The first current control algorithm of FIG. 5 is completely based on receiver gain settings, and thus may be said to be AGC dependent. At step 100, a determination is made of channel power. In step 102, an optimal gain control algorithm is executed to adjust the gain of each included gain block within the receiver 10. So, the operation of step 102 would implicate setting the gain of the LNA, VGA1 and VGA2 blocks of the receiver 10. Next, a number of steps are implemented to make current adjustments in the receiver 10. Generally speaking, in these steps thresholds related to a particular receiver parameter (like single tone desensitization, intermodulation response rejection and SFDR) are compared versus optimal gain setting. Responsive thereto, a current consumption correction is implemented, if appropriate, for each of the gain blocks (LNA, VGA1 and VGA2) and the VCO to satisfy the requirements identified above. Although FIG. 5 illustrates all three threshold comparisons and possible current adjustments being implemented, it will be understood that individual ones or less than all of the illustrated comparisons/adjustments can be performed if desired.

More particularly, in one comparison/adjustment process shown in FIG. 5, measured channel power/gain setting is compared (step 104) to a referred tolerable single tone blocker threshold (in essence assuming that a single tone interferer may be present). As discussed above, receiver gain decreases as the desired input signal level increases. When the threshold comparison is satisfied, the LNA $IIP_3$ is decreased by reducing (step 106) both the current consumed by the LNA and the current consumed by the VCO of the frequency synthesizer. This is accomplished by the digital signal processor

40 issuing appropriate current adjustment commands on the control bus. These commands are interpreted and acted upon by the current control circuits 50(1) and 50(3). The operation of steps 104 and 106 in effect compares the set gain level(s) to a recognized single tone desensitization point (i.e., the high gain set point at which the receiver is desensitized to single tone interference). When receiver gain decreases due to increased signal strength, the test of step 104 is satisfied because the single tone interference threshold requirement is satisfied and a reduction in current in step 106 is permitted without concern over single tone interference.

In another comparison/adjustment process shown in FIG. 5, measured channel power/gain setting is compared (step 108) to a referred acceptable IRR level threshold (where IRR is a measure of receiver ability to receive a signal with acceptable degradation level in the presence of two out-of-channel interfering continuous wave signals whose third order intermodulation product falls within the desired channel). As discussed above, $IIP_{3o}$ increases as receiver gain decreases (for example, due to increases in the desired input signal level). At some point with respect to receiver gain, $IRR_3$ exceeds its requirement. When the threshold comparison is satisfied, then a reduction (step 110) can be made in the current consumed by the VGA1. Optionally, the reduction of step 110 can further include a reduction in the current consumed by the mixer. This is accomplished by the digital signal processor 40 issuing appropriate current adjustment commands on the control bus. These commands are interpreted and acted upon by the current control circuits 50(2) and 50(4). To the extent LNA current must be optimized to successfully implement the reduction of step 110, it will be noted that this comparison/adjustment process of steps 108/110 can be implemented with the comparison/adjustment process of step 104/106 which effectuated a setting of LNA current for single tone desensitization.

In yet another comparison/adjustment process of FIG. 5, measured channel power/gain setting is compared (step 112) to a referred acceptable SFDR level threshold. As discussed above, $IIP_3$ increases as receiver gain decreases (for example, due to increases in the desired input signal level). At some point with respect to receiver gain, SFDR exceeds its requirement. When the threshold comparison is satisfied, then a reduction (step 114) can be made in the current consumed by the VGA2. This is accomplished by the digital signal processor 40 issuing appropriate current adjustment commands on the control bus. These commands are interpreted and acted upon by the current control circuit 50(5). To the extent LNA, mixer and VGA2 currents must be optimized to successfully implement the reduction of step 114, it will be noted that this comparison/adjustment process of steps 112/114 can be implemented with the comparison/adjustment process of steps 104/106 and 108/110 which effectuated a setting of LNA current for single tone desensitization and mixer/VGA1 current for $IIR_3$ optimization.

Figure 6A:
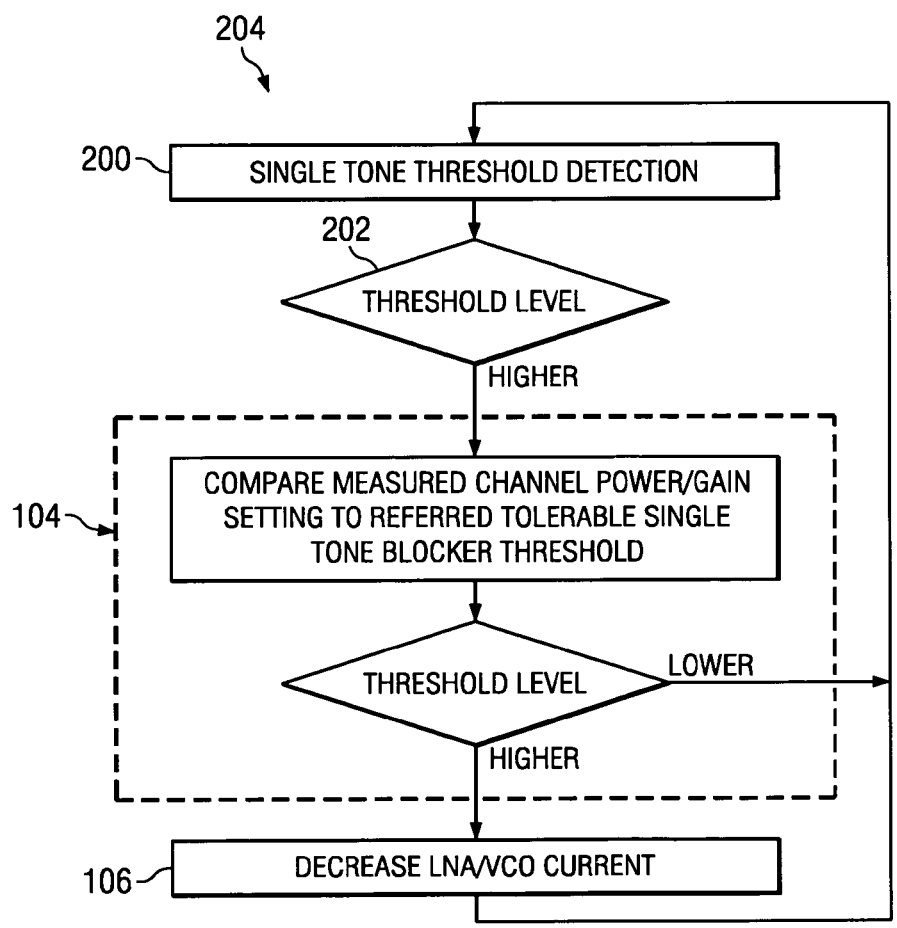
FIGS. 6A and 6B are a flow diagrams illustrating a second current control algorithm.
Figure 6B:
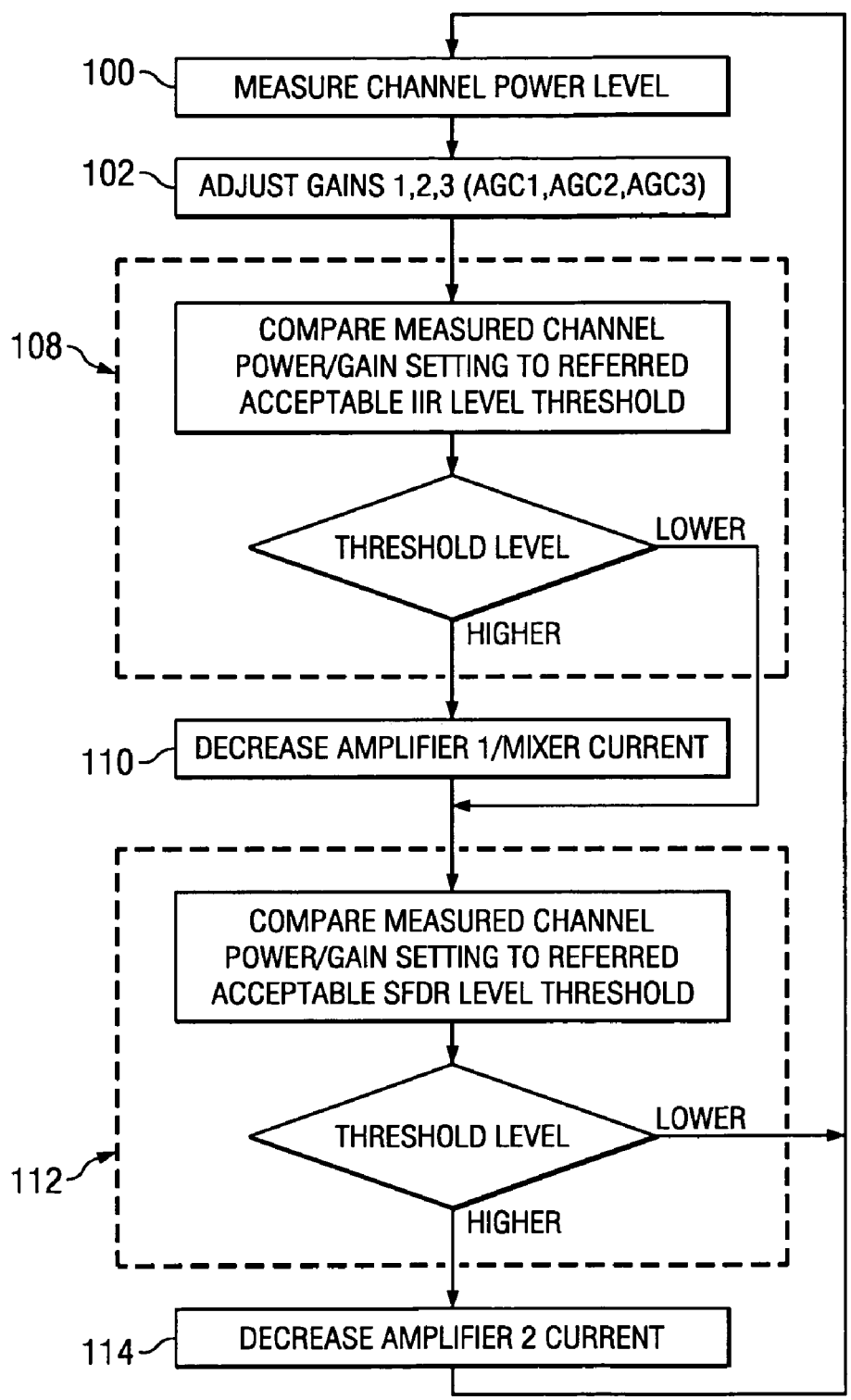

Reference is now made to FIGS. 6A and 6B wherein there is shown a flow diagram illustrating a second current control algorithm for setting operation of the receiver 10 of FIG. 1 in accordance with an embodiment of the invention. The second current control algorithm of FIG. 6A represents a case where LNA and VCO current settings depend on a detected single tone interferer. In contrast to FIG. 5, where it was assumed that a single tone interferer may be present and then current adjustments were made based on gain settings, the algorithm of FIG. 6A actually detects the presence of the single tone interferer as a trigger to control current adjustment operations. To that end, the single tone detector 42 in FIG. 1 is placed between the input and output of the channel filter 32 so as to allow a measurement to be made of a difference between the received signal on the input and output of the channel filter is determined (step 200). This difference is then compared (step 202) against a single tone threshold. As long as the threshold is not satisfied (i.e., the single tone interferer is not detected as being present), a reduction can be made (generally reference 204) in both the current consumed by the LNA and the current consumed by the VCO of the frequency synthesizer (see, steps 104 and 106, and discussion of FIG. 5). Otherwise, if the current channel gain setting is higher than the threshold, then current within at least a portion of the receiver is increased (not explicitly shown in FIG. 6A). These current changes are accomplished by the digital signal processor 40 issuing appropriate current adjustment commands on the control bus. These commands are interpreted and acted upon by the current control circuits 50(1) and 50(3). The remainder of the algorithm is shown in FIG. 6B and operates in the same way as shown in FIG. 5 and discussed above (i.e., it is based on measured gain).

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method, comprising:
   determining whether a single tone interferer is present with respect to a receiver received signal;
   if not present, then comparing a channel gain control input setting for a device in the receiver to a first threshold; and
   if the channel gain control input setting is less than the first threshold, then decreasing current consumed within at least the device of the receiver.

2. The method of claim 1 wherein decreasing comprises decreasing current consumed by a low noise amplifier within the receiver.

3. The method of claim 1 wherein decreasing comprises decreasing current consumed by a frequency synthesizer within the receiver.

4. The method of claim 1 wherein the first threshold is a tolerable single tone blocker threshold.

5. The method of claim 4 wherein decreasing comprises decreasing current consumed by a low noise amplifier within the receiver.

6. The method of claim 4 wherein decreasing comprises decreasing current consumed by a frequency synthesizer within the receiver.

7. The method of claim 4 further comprising:
   measuring channel power with respect to the receiver received signal;
   adjusting receive signal path gain within the receiver;
   comparing a channel gain control input setting for a device within the receiver to a second threshold; and
   if the channel gain control input setting is less than the second threshold, then decreasing current consumed within at least the device of the receiver.

8. The method of claim 7 wherein the second threshold is an acceptable intermodulation response rejection threshold.

9. The method of claim 8 wherein decreasing comprises decreasing current consumed by a variable gain amplifier within the receiver.

10. The method of claim 8 wherein decreasing comprises decreasing current consumed by a mixer within the receiver.

11. The method of claim 8 further comprising:
comparing a channel gain control input setting for a device within the receiver to a third threshold; and
if the channel gain control input setting is less than the third threshold, then decreasing current consumed within at least the device of the receiver.

12. The method of claim 11 wherein the third threshold is an acceptable spurious free dynamic range threshold.

13. The method of claim 12 wherein decreasing comprises decreasing current consumed by a variable gain amplifier within the receiver.

14. A method, comprising:
measuring channel power with respect to a receiver received signal;
adjusting receive signal path gain within the receiver;
comparing a channel gain control input setting for a device in the receiver to a threshold; and
if the channel gain control input setting is less than the threshold, then decreasing current consumed within at least the device of the receiver.

15. The method of claim 14 wherein the threshold is a tolerable single tone blocker threshold.

16. The method of claim 15 wherein decreasing comprises decreasing current consumed by a low noise amplifier within the receiver.

17. The method of claim 15 wherein decreasing comprises decreasing current consumed by a frequency synthesizer within the receiver.

18. The method of claim 14 wherein the threshold is an acceptable intermodulation response rejection threshold.

19. The method of claim 18 wherein decreasing comprises decreasing current consumed by a variable gain amplifier within the receiver.

20. The method of claim 18 wherein decreasing comprises decreasing current consumed by a mixer within the receiver.

21. The method of claim 14 wherein the threshold is an acceptable spurious free dynamic range threshold.

22. The method of claim 21 wherein decreasing comprises decreasing current consumed by a variable gain amplifier within the receiver.

23. A receiver, comprising:
a circuit that determines whether a single tone interferer is present with respect to a receiver received signal;
an automatic gain control circuit for setting a channel gain for the receiver;
a processor operable to compare a channel gain control input setting for a device within the receiver to a first threshold and, if the channel gain control input setting is less than the first threshold, issue a first command to decrease current consumption in the device; and
a first current control circuit coupled to the device of the receiver and operable responsive to the first command to decrease current consumption by that device.

24. The receiver of claim 23 wherein the device is a low noise amplifier within the receiver.

25. The receiver of claim 23 wherein the device is a frequency synthesizer within the receiver.

26. The receiver of claim 23 wherein the first threshold is a tolerable single tone blocker threshold.

27. The receiver of claim 26 wherein the device is at least one of a low noise amplifier and a frequency synthesizer within the receiver.

28. The receiver of claim 26 wherein the processor is further operable to compare a channel gain control input setting for a device within the receiver to a second threshold and, if the channel gain control input setting is less than the second threshold, issue a second command to decrease current, the receiver further comprising:
a second current control circuit coupled to the device of the receiver and operable responsive to the second command to decrease current consumption by that device.

29. The receiver of claim 28 wherein the second threshold is an acceptable intermodulation response rejection threshold.

30. The receiver of claim 29 wherein the device is at least one of a variable gain amplifier and a mixer within the receiver.

31. The receiver of claim 29 wherein the processor is further operable to compare a channel gain control input setting for a device within the receiver to a third threshold and, if the channel gain control input setting is less than the third threshold, issue a third command to decrease current, the receiver further comprising:
a third current control circuit coupled to the device of the receiver and operable responsive to the third command to decrease current consumption by that device.

32. The receiver of claim 31 wherein the third threshold is an acceptable spurious free dynamic range threshold.

33. The receiver of claim 32 wherein the device is a variable gain amplifier within the receiver.

34. A receiver, comprising:
an automatic gain control circuit for setting a channel gain for the receiver;
a processor operable to compare a control input setting for a device within the receiver to a first threshold and, if the channel gain control input setting is less than the first threshold, issue a first command to decrease current; and
a current control circuit coupled to at least the device of the receiver and operable responsive to the first command to decrease current consumption by that device.

35. The receiver of claim 34 wherein the threshold is a tolerable single tone blocker threshold.

36. The receiver of claim 35 wherein the device is at least one of a low noise amplifier and a frequency synthesizer within the receiver.

37. The receiver of claim 34 wherein the threshold is an acceptable intermodulation response rejection threshold.

38. The receiver of claim 37 wherein the device is at least one of a variable gain amplifier and a mixer within the receiver.

39. The receiver of claim 34 wherein the threshold is an acceptable spurious free dynamic range threshold.

40. The receiver of claim 39 wherein the device is a variable gain amplifier within the receiver.

* * * * *

UNITED STATES PATENT AND TRADEMARK OFFICE
CERTIFICATE OF CORRECTION

PATENT NO. : 7,457,607 B2
APPLICATION NO. : 11/028831
DATED : November 25, 2008
INVENTOR(S) : Krivokapic It is certified that error appears in the above-identified patent and that said Letters Patent is hereby corrected as shown below:

In The Specification

In Column 5, Line 57, delete "($IIP_{30}$-Pi)" and insert -- ($IIP_{3o}$-Pi) --, therefor.

In Column 5, Line 61, delete "$IIP_{30}$" and insert -- $IIP_{3o}$ --, therefor.

In Column 6, Line 3, delete "$IIP_{30}$" and insert -- $IIP_{3o}$ --, therefor.

Signed and Sealed this
Twenty-sixth Day of April, 2016

Michelle K. Lee
*Director of the United States Patent and Trademark Office*